US007758244B2

(12) United States Patent
Bauer

(10) Patent No.: US 7,758,244 B2
(45) Date of Patent: Jul. 20, 2010

(54) LINEAR GUIDE UNIT, IN PARTICULAR GANTRY AXIS

(75) Inventor: Siegfried Bauer, Massbach-Volkershausen (DE)

(73) Assignee: Rexroth Star GmbH, Schweinfurt (DE)

( * ) Notice: Subject to any disclaimer, the term of this patent is extended or adjusted under 35 U.S.C. 154(b) by 661 days.

(21) Appl. No.: 11/685,353

(22) Filed: Mar. 13, 2007

(65) Prior Publication Data
US 2007/0154121 A1 Jul. 5, 2007

(30) Foreign Application Priority Data

May 28, 2004 (DE) .................. 10 2004 026 146
Apr. 27, 2005 (DE) .................. 10 2005 019 606

(51) Int. Cl.
*F16C 29/06* (2006.01)
*F16C 35/00* (2006.01)

(52) U.S. Cl. ..................... 384/45; 384/15; 384/440
(58) Field of Classification Search ............... 384/15, 384/43–45, 49–50, 55–59, 440–441
See application file for complete search history.

(56) References Cited

U.S. PATENT DOCUMENTS

| 4,149,759 | A | * | 4/1979 | Miller ...................... 384/302 |
| 4,614,382 | A | * | 9/1986 | Teramachi ................. 384/45 |
| 4,934,835 | A | * | 6/1990 | Albert ....................... 384/43 |
| 5,076,714 | A |   | 12/1991 | Teramachi |
| 5,845,996 | A |   | 12/1998 | Greubel et al. |
| 5,868,499 | A | * | 2/1999 | Greubel et al. ............. 384/15 |
| 6,019,514 | A |   | 2/2000 | Feinstein |
| 6,227,708 | B1 | * | 5/2001 | Rixen et al. ................ 384/45 |
| 6,402,381 | B1 |   | 6/2002 | Shirai et al. |
| 2001/0024535 | A1 | | 9/2001 | Keller |
| 2003/0136207 | A1 | | 7/2003 | Bauer |

FOREIGN PATENT DOCUMENTS

| DE | 297 06 034 | 1/1998 |
| DE | 100 35 364 | 2/2001 |
| DE | 102 02 737 | 7/2003 |
| EP | 0 417 304 | 3/1991 |
| EP | 1 120 585 | 8/2001 |
| JP | 10094936 A * | 4/1998 |

* cited by examiner

*Primary Examiner*—Marcus Charles
(74) *Attorney, Agent, or Firm*—Michael J. Striker

(57) ABSTRACT

A linear guide unit, in particular a gantry axis, that has an oblong guide support (14), is provided with two essentially parallel guide rails (24, 26) extending in the guide direction (F), but rotated in relation to each other around a rotation axis (V) parallel to the guide direction (F), each of which guide rails (24, 26) has at least one sliding carriage (36, 38) guided on it so that it can slide in the guide direction (F), the sliding carriages (36, 38) being connected to a sliding carriage assembly (36, 38) capable of moving as a unit in the guide direction (F). According to the present invention, the two guide rails (24, 26) rest essentially without moving play against at least two counterpart support surfaces (GF24, GF24L, GF24R, GF26, GF26L, GF26R) of the guide support (14) extending essentially in the guide direction (F), two of the counterpart support surfaces (GF24, GF24L, GF24R, GF26, GF26L, GF26R) enclosing a predetermined angle, preferably of at most 90°, between them.

3 Claims, 8 Drawing Sheets

LINEAR GUIDE UNIT, IN PARTICULAR GANTRY AXIS

CROSS-REFERENCE

This application is a division of U.S. patent application Ser. No. 11/137,986 filed on May 26, 2005. The invention described and claimed hereinbelow claims the benefit of priority from the patent application Ser. No. 11/137,986 under 35 USC 120, now U.S. Pat. No. 7,241,047.

The invention described and claimed hereinbelow and in U.S. patent application Ser. No. 11/137,986 is also described in German Patent Applications DE 10 2004 026 146.6 filed on May 28, 2004 and DE 10 2005 019 606.3 filed on Apr. 27, 2005, which provides the basis for a claim of priority of invention under 35 USC 119(a)-(d). The patent application Ser. No. 11/137,986, now U.S. Pat. No. 7,241,047, contains certified copies of these two German Patent Applications.

FIELD OF THE INVENTION

The present invention relates to a linear guide unit, in particular a gantry axis, with an oblong guide support, which is provided with two essentially parallel guide rails extending in a guide direction, but rotated in relation to each other around a rotation axis parallel to the guide direction, each of which has at least one sliding carriage guided on it so that it can slide in the guide direction, the sliding carriages being connected to a sliding carriage assembly capable of moving jointly in the guide direction.

BACKGROUND OF THE INVENTION

A linear guide unit of this kind, known as a gantry module, is produced by Afag AG, a company specializing in automated manufacturing technology in Menziken (CH).

The disadvantage in the known gantry modules is that each guide rail is only affixed to the guide support frictionally. The guide rails are attached to the guide support by means of screws; the screws press a support surface of the respective guide rails against a counterpart support surface of the guide support with a predetermined contact force. The intensity of the contact force determines the amount of frictional force preventing the guide rail from shifting in the lateral direction, which lateral direction lies in a contact plane orthogonal to a lifting direction of the guide rail away from the guide support, between the support surface and the counterpart support surface, and is oriented orthogonal to the guide direction. It is therefore clearly evident that the lateral forces that can be absorbed by each guide rail are merely a fraction of the contact forces exerted by the fastening screws of the respective guide rail.

In the known gantry axis, the two guide rails are rotated in relation to each other by 90° around a rotation axis parallel to the guide direction. It is therefore possible to attach loads to two fastening surfaces orthogonal to each other on a moving load carrier of the known gantry axis; a guide rail and a sliding carriage guided on it is continuously acted on by an applied load. But the above-mentioned lateral forces still act on the respective other guide rail with a force component orthogonal to the guide direction and orthogonal to the lifting direction of the respective guide rail away from the guide support.

SUMMARY OF THE INVENTION

The object of the present invention, therefore, is to disclose a linear guide unit of the above-mentioned type that has a higher overall carrying capacity than the known linear guide unit.

This object is attained according to the present invention by means of a linear guide unit of the above-mentioned type, in which the two guide rails rest essentially without moving play against at least two counterpart support surfaces of the guide support extending essentially in the guide direction, two of the counterpart support surfaces enclosing a predetermined angle between them.

Each guide rail consequently rests against at least two counterpart support surfaces of the guide support that extend in the guide direction and are inclined in relation to each other around an inclination axis parallel to the guide direction. This makes it possible to support a force acting in the lateral direction of the guide rail, i.e. in a direction that is both orthogonal to the guide direction and orthogonal to a supporting direction of the guide rail in relation to the guide support, that is significantly higher than the amount of force that can be supported by the prior art. The supporting direction in this context is a direction orthogonal to the guide direction that also extends parallel to an imaginary longitudinal central plane of a guide rail extending in the guide direction; the imaginary longitudinal central plane passes through a support region on which a rail foot of the guide rail rests against the guide support. The supporting direction is oriented in the direction opposite the previously mentioned lifting direction.

The pair of counterpart support surfaces can reliably support any bearing force, which the guide rail can exert on the guide support in a direction orthogonal to the guide direction and the direction of whose bearing force action lies between the surface normals of the two counterpart support surfaces. To absorb bearing forces of this kind, the above-described pair of counterpart support surfaces on the guide support fix the guide rail to the guide support in a form-locked manner. The smaller the angle between the two counterpart support surfaces, the greater the angle enclosed between the two surface normals. The angle referred to here is the angle enclosed by the surface normal vectors pointing away from their respective associated surfaces when they are shifted to a shared origin (see FIGS. 5a and 5b). The counterpart support surfaces F1 and F2 depicted in projection there enclose the angle γ. The associated surface normal vectors N1 and N2, though, enclose an angle δ, where δ=180°−γ. The angle δ consequently also represents the angular range of application lines of bearing forces for which a form-locked engagement is achieved in the support region. This form-locked region can be used to particular advantage with angles enclosed between the counterpart support surfaces of γ≦90° due to the multitude of bearing forces that can be supported.

Moreover, at an enclosed angle of γ=90° or less, the two counterpart support surfaces can support orthogonal bearing forces in a form-locked manner.

Frequently, however, the linear guide units in question are manufactured and delivered to the buyer without any knowledge of the application for which the buyer intends to use them. If the direction of the bearing force action is unknown, the guide support is still capable of supporting a very powerful force exerted by the guide rail onto the guide support orthogonal to the guide direction if each guide rail, as a fixed supporting rail, rests against at least three counterpart support surfaces of the guide support, which extend essentially in the guide direction, in such a way that a rail-accommodating section of the guide support encloses the guide rail on three sides.

It is particularly preferable for the counterpart support surfaces to be embodied on the guide support in such a way that each pair of counterpart support surfaces engaging two adjacent sides of a guide rail enclose an angle of at most 90°. As a result, the guide rail can be inserted into a groove in the guide support, which groove extends in the guide direction and has vertical side surfaces, or can even be affixed to the guide support in the form of a dovetail joint, i.e. with side surfaces that are embraced from behind by the guide support. Even just the fixing of the guide rail with side surfaces that are embraced from behind by the guide support permits a reliable absorption of lifting forces that have a force component in the lifting direction of a guide rail away from the guide support. When the side surfaces of the guide rails are embraced from behind, in principle the only thing limiting the amount of lifting force that can be supported is the material strength of the material used to manufacture the guide support.

The embodiment of the two guide rails in the form of so-called fixed supporting rails, which permit any shifting at all orthogonal to the guide direction, does in fact require very precise manufacture and assembly, but the required manufacture and assembly precision can easily be achieved with currently available numerically controlled finishing equipment.

In order to simplify assembly, each guide rail can simply be inserted into a longitudinal groove provided on the guide support. The longitudinal groove can either be produced as a part of the extrusion of the guide support or can be let into a guide support blank with even higher precision by numerically controlled cutting finishing work.

A high-strength seating of a guide rail in the guide support can be achieved through caulking of the guide support. This also enables a longitudinal groove into which the guide rail can be inserted to be produced with the required amount of tolerance, thus facilitating insertion of the guide rail into the longitudinal groove. During assembly, a clamping device can immobilize each guide rail in the desired final position before the caulking; after it is fixed in place, the caulking is executed.

It is also conceivable for the guide rails to be affixed to the guide support exclusively by means of caulking. An even greater positional security of the guide rails, primarily to prevent a guide rail from lifting away from the guide support, can be achieved by screwing a guide rail to the guide support.

Another disadvantage of the known gantry axis is that the guide rails are openly exposed to and unprotected from external influences so that they can easily become soiled, which with particularly unfavorable soiling, e.g. cuttings falling onto the guide rails, can end up damaging a guide assembly comprised of guide rails and sliding carriages.

Alternatively or in addition to the above-mentioned concept of the present invention, the linear guide unit can, according to another aspect of the present invention, have a cover that is positioned on the guide support to constitute a guide housing in such a way that the guide support and cover together form two guide cavities in which each guide rail is provided with a sliding carriage that it supports in a sliding fashion; along each guide cavity, a guide opening extending in the guide direction is provided, through which the sliding carriages are connected by means of a shared connecting element to a sliding carriage assembly.

The cover protects the guide rails and sliding carriages from external influences and reduces or even eliminates the risk of the guide rails and sliding carriages becoming soiled. This increases the longevity of the linear guide unit according to the present invention. The cover can be secured by end-mounted sealing units that are positioned at the longitudinal ends of the guide support. DE 102 02 737 A1 has disclosed this kind of end-mounted sealing units for a linear guide unit that has two parallel guide rails that are not rotated in relation to each other; only one of the two guide rails of the linear guide unit known from DE 102 02 737 A1 is embodied in the form of a fixed supporting rail as defined by the present application.

For particularly long linear guide units, problems can arise if the cover is supported only at the longitudinal ends of the linear guide unit. The cover can therefore be supported at least in parts between its longitudinal ends in the guide direction, preferably by means of at least one supporting element that can be slid in the guide direction, preferably a plurality of supporting elements.

Supporting elements of this kind are known, for example, from the previously mentioned DE 102 02 737 A1 or from EP 1 120 585 A2. If the sliding carriages are driven by a rotating spindle, then these supporting elements can also simultaneously support at least parts of the spindle on the guide support in the guide direction. It should be noted that it is basically also possible for the cover to be supported on the guide support exclusively by means of supporting elements, i.e. without end-mounted sealing units.

Alternatively or in addition, the cover can rest against at least parts of the guide support in the guide direction. The guide support is a particularly stable and rigid component, which is able to absorb the additional retention force for the cover without experiencing any significant deformation, thus making it possible to produce a particularly rigid assembly comprised of the guide support and cover.

To this end, in a concrete embodiment, the guide support can be provided with a holding device, which cooperates with a counterpart holding device provided on the cover in order to support the cover on the guide support. The provision of holding devices and counterpart holding devices is a simple way to permit easy replacement of the cover on the guide support, without negatively affecting the holding security and rigidity of the cover. This makes it possible to provide the same guide support with suitable covers as needed or to easily replace a cover when it is damaged.

The holding device of the guide support and counterpart holding device on the cover advantageously cooperate to produce a nonpositive, frictional engagement and/or a form-locking engagement. As a form-locking engagement, a support surface on the cover functioning as a counterpart holding device can rest against a bearing surface on the guide support functioning as a holding device and can thus support the cover on the guide support in a form-locking way orthogonal to the contact plane and in a nonpositive, frictional way in the contact plane. Because of the higher possible holding forces, however, it is preferable to produce a form-locking engagement between the holding device and the counterpart holding device so that all of the forces acting on the supporting point can be transmitted via the form-locking engagement between the cover and the guide support.

It is particularly preferable for the holding device and the counterpart holding device to be designed so that they can be detent connected to each other, in particular, detent connected in a detachable way. This makes it possible for a cover to be installed and supported in a simple manner, for example by means of being simply snapped into place on the guide support. The cover or the guide support can also be easily replaced as needed.

In a particularly simple and therefore advantageous structural design, the holding device or the counterpart holding device has a material thickening and the respective other device has an embracing geometry that embraces the material thickening from behind. The embracing geometry can, for example, be a partial cylinder shell on the latter device mentioned above, which, when the cover is mounted onto the guide support, engages with a bead-like material thickening on the former device mentioned above, with a more than 180° arc of contact. In particular, the circumference angle over which the partial cylinder shell of the embracing geometry extends and/or the material of the embracing geometry can be selected so that the embracing geometry can be brought into an engagement in which it engages behind the material thickening through elastic deformation in response to a joining force to be exerted manually.

It is possible to achieve a particularly steady support of the cover on the guide support if a vibration-damping material is provided between the holding device and counterpart holding device. To this end, for example, a layer of plastic material, in particular foamed plastic material, can be provided in the force transmission path between the holding device and the counterpart holding device.

To achieve an increased rigidity of an assembly comprised of the guide support and cover, it essentially suffices if the cover is supported along a section of the guide support in the guide direction. To achieve a particularly high degree of rigidity, however, it is preferable for the cover to be supported on the guide support essentially over its entire length.

A particularly high degree of rigidity of the guide housing comprised of the guide support and cover with a simultaneously reduced assembly cost can be achieved by embodying the cover as integral to the guide support. When an extruded profile is used as a guide housing, a one-piece embodiment of the guide support and cover can be achieved very easily through the use of an appropriate extrusion die.

To permit the cover to optimally fulfill its function of covering the guide rails that are rotated in relation to each other, the cover preferably has two leg sections, which are inclined by a predetermined angle in relation to each other around an inclination axis parallel to the guide direction.

The cover is matched to the arrangement of the guide rails in the best way if the inclination angle of the leg sections is essentially equal to the angle by which the guide rails are rotated in relation to each other.

In principle, it is possible for the cover to be comprised solely of the above-mentioned leg sections and to be L-shaped in cross section. However, the amount of space taken up by the guide housing is reduced if the leg sections are connected to each other by means of a connecting section situated between them, which adjoins each of the leg sections in the circumference direction at a connecting inclination angle not equal to 180° around an axis parallel to the guide direction. In this context, a connecting inclination angle of 180° represents a rare case in which sections adjoin each other at a flat angle, which is as a rule indistinguishable from a single, continuous section.

For the sake of a simple manufacture, the connecting section should have an essentially flat outer surface.

An essential advantage of the linear guide units of the above-mentioned type is that a table part, which has at least two table surfaces that are angled in relation to each other around an angle axis essentially parallel to the guide direction, can be moved in the guide direction. Additional parts, such as tools and the like, can be fastened to each of the table surfaces. The table part is connected to at least one sliding carriage on each guide rail to produce an assembly that moves as a unit so that a load acting on the table part can be transmitted via the sliding carriages to the guide rails and then onto the guide support.

In order to reinforce the table part, it can be provided with a reinforcing formation, preferably in such a way that an outer surface of the reinforcing formation and an outer surface of the connecting section are oriented toward each other at least in parts. It is then possible to accommodate the reinforcing formation in the volume region close to the guide housing, which volume region has been freed up by the production of the connecting section, without increasing the overall structural volume taken up by the linear guide unit. The expression "in parts" here indicates a part extending in the circumference direction around a longitudinal axis of the linear guide unit, parallel to the guide direction.

The reinforcing formation here can be a material aggregation that increases a positional stability of at least two table surfaces that are angled in relation to each other. It can, for example, be provided in the connecting region of two table surfaces of the table part. To save weight, however, it is preferable for the reinforcing formation to be a rib that connects table surfaces of the table part and/or the partial table sections to which the respective table surfaces belong.

In order to facilitate a possibly desired sealing of the table part in relation to the outer surface of the guide housing, it is advantageous if the outer surface of the reinforcing formation oriented toward the connecting section of the covering element and the outer surface of the connecting section oriented toward the reinforcing formation form a gap that extends at least in parts in the circumference direction around a longitudinal axis parallel to the guide direction. A gap of this kind, particularly when it has a narrow gap width of only a few millimeters, can be very easily protected from the entry of coarse dirt by means of brushes or sealing lips. The entry of dirt can be prevented even more easily if the gap has a virtually constant gap width in the circumference direction. This means that the gap width in the circumference direction varies by no more than 25% with regard to the maximum gap width, preferably by no more than 20%, particularly preferably by no more than 10%.

As has been explained above, each guide rail is associated with a guide opening extending essentially in the guide direction, through which the sliding carriages are connected by means of a shared connecting element, such as the table part, to a sliding carriage assembly. The area of the guide openings in comparison to the overall external area of the guide housing is in fact rather small, but the efficiency of the shielding of the guide rails and sliding carriages from external influences can be improved even further if at least one of the guide rails, preferably each of the guide rails, is associated with a covering belt that covers the guide opening. According to an advantageous modification of the present invention, the covering belt can be a revolving covering belt, its upper run covering the guide opening associated with the respective guide rail and its lower run extending in a cavity of the guide support.

To reduce weight further, at least one sliding carriage can be embodied in a one-part design made of aluminum. For wear-reduction purposes, it is advantageous if it has at least one insert made of a harder metal, in particular steel, which constitutes a rolling surface for the roller elements supporting the sliding carriage. Preferably, both of the sliding carriages are embodied in this way. However, this is not intended to mean that the use of light metal sliding carriages is absolutely required. Rather, it should be expressly stated that conventional sliding carriages made of steel, possibly with plastic inserts, can also be used in the linear guide unit according to the present invention.

It is also conceivable for at least one sliding carriage to be embodied as integral to the shared connecting element. In order to attach the shared connecting element to the remaining sliding carriage, this carriage can be provided with a connecting component, which is designed to connect the sliding carriage to the shared connecting element. But a high degree of flexibility in the layout of the linear guide unit according to the present engine is achieved if both of the sliding carriages are provided with such a connecting component. It is then possible to manufacture the linear guide unit with the guide housing and the sliding carriages in a standard form and to provide them with a connecting element that is individualized according to customer specifications. The connecting component can be integral to the sliding carriage or can be embodied as a separate component.

To reduce or completely prevent distortions that can arise due to tolerances in the sections of the guide support accommodating the guide rails in the connecting element, in particular in the form of the table part, the connecting component can be designed so that it rests with a first contact surface against a sliding carriage counterpart surface of the sliding carriage and/or rests with a second contact surface against a connecting element counterpart surface of the connecting element; at least one of the following surfaces is embodied as crowned: the first contact surface, the sliding carriage counterpart surface, the second contact surface, and the connecting element counterpart surface. The crowned design of at least one of the interface surfaces between the connecting element and the sliding carriage permits the connecting element to deform in the event of forces arising from distortions; this intentional deformation decreases the amount of distortion.

Due to the greater proximity to the connecting element, which should reduce or even prevent distortions, it is advantageous if at least one of the surfaces including the second contact surface and the connecting element counterpart surface is embodied as crowned. If, as described above, the connecting component is embodied as integral to the sliding carriage, then these two surfaces are the only ones that are available to be embodied as crowned anyway.

In the context of the present application, the term "crowned" is understood to mean that the surface is convexly curved around at least one curvature axis. Preferably, this curvature axis extends in the guide direction when the linear guide unit is fully assembled.

According to a preferred modification of the present invention, the table part is the above-mentioned connecting element.

To reduce the manufacturing costs, it is particularly advantageous to embody the second contact surface as crowned.

Preferably, the rotation angle between the two guide rails is approximately 90° since this makes it possible for bearing forces whose acting directions are rotated by 90° to be supported on at least one of the guide rails as support forces.

The present invention will be explained in greater detail below in conjunction with exemplary embodiments.

DESCRIPTION OF THE PREFERRED EMBODIMENTS

Figure 1:
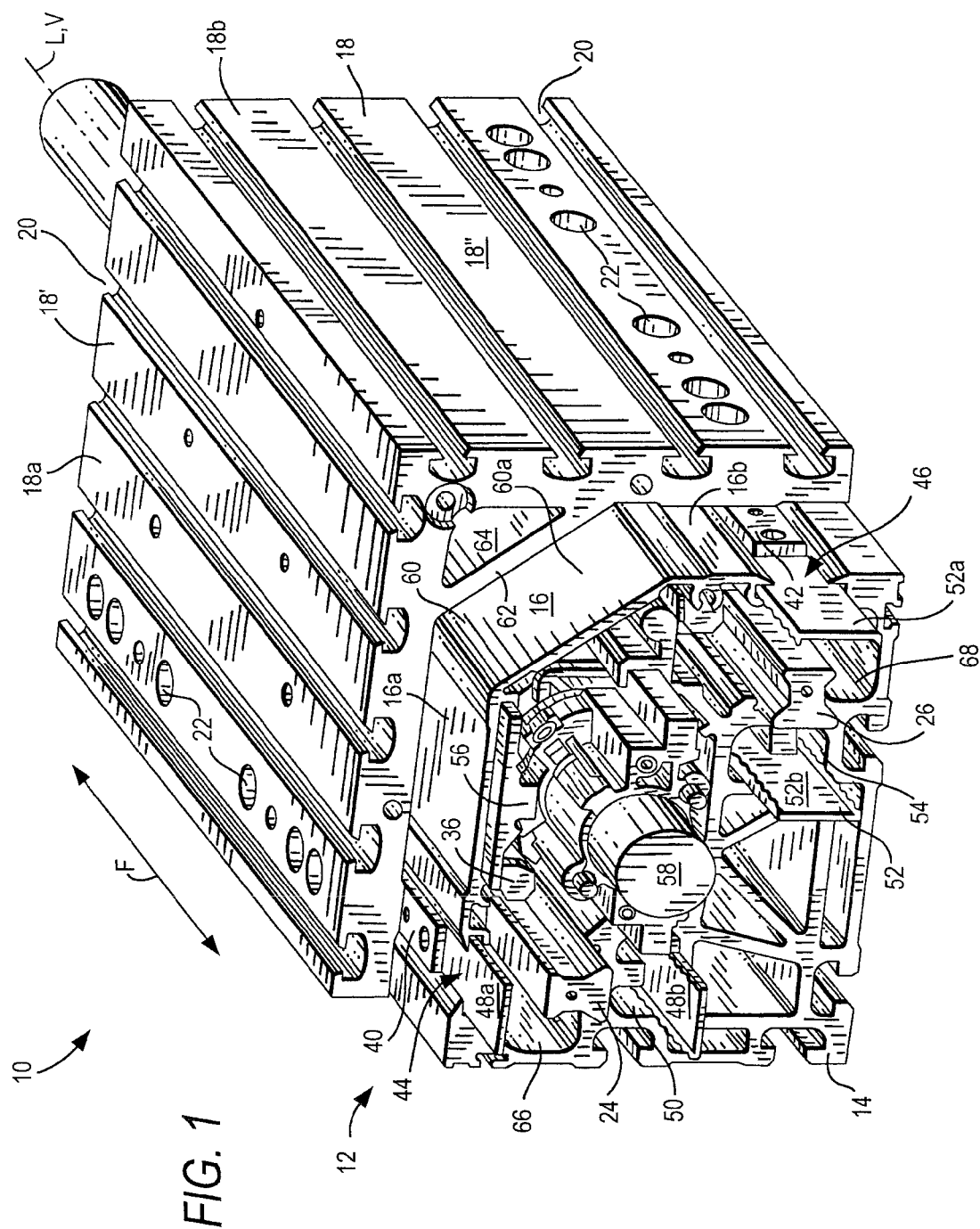
FIG. 1 is a perspective view of a linear guide unit according to the present invention, with a laid-open guide housing.

In FIG. 1, a linear guide unit according to present invention is labeled as a whole with the reference numeral 10. The linear guide unit includes a guide housing 12 that has a guide support 14 with a covering element 16 supported on it. The linear guide unit 10 also includes an essentially L-shaped table part 18 with table surfaces 18a and 18b that are orthogonal to each other attached to table legs 18' and 18". The table surfaces 18a and 18b, which serve as clamping surfaces for the attachment of objects, are provided with grooves 20 and bores 22 as fastening aids that permit objects to be clamped thereto. For the sake of clarity, not all of the grooves and bores 20 and 22 have been provided with reference numerals. However, specialists in the field will be readily familiar with the provision of grooves and bores on clamping surfaces of the table part 18.

The table part 18 is guided so that it can move on the guide housing 12 along a guide direction represented by the double arrow F. The guide direction F is essentially parallel to the longitudinal axis L of the linear guide unit 10.

Figure 2:
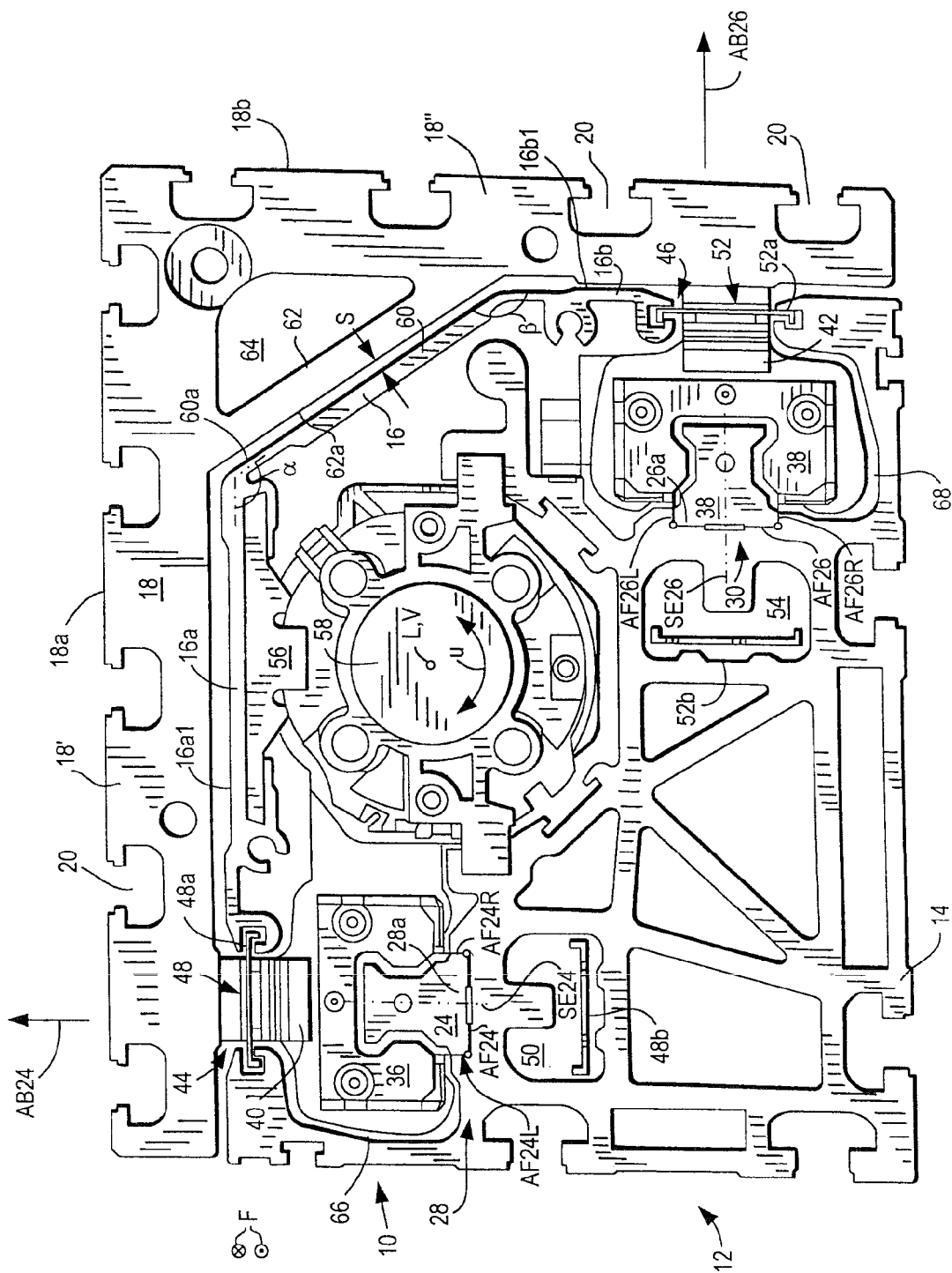
FIG. 2 shows a view of the linear guide unit from FIG. 1, viewed from an end in the longitudinal direction of the linear guide unit.

To assure precise guidance, two guide rails 24 and 26 are provided on the guide support 14. These guide rails 24 and 26, which extend essentially in the longitudinal direction L of the linear guide unit 10, are positioned on the guide support 14 rotated in relation to a rotation axis V parallel to the longitudinal axis L. In the examples shown in FIGS. 1 through 4, the rotation angle is 90°. As a result, each of the guide rails 24 and 26 can absorb respective supporting forces which have action directions that are rotated by 90° in relation to each other so that the supporting forces that can be absorbed by the guide rail 24 and the guide rail 26 have linearly independent force components. In the context of the present application, a supporting force of a guide rail is understood to be any force acting in opposition to the lifting direction AB24 or AB26, whose line of application is parallel to the longitudinal central symmetry plane of the corresponding guide rail. FIG. 2 shows the longitudinal central symmetry planes SE24 and SE26 of the guide rails 24 and 26 as well as the lifting directions AB24 and AB26. The longitudinal central symmetry planes are oriented orthogonal to the plane of the drawing in FIG. 2 and orthogonal to each other. Furthermore, each longitudinal central symmetry plane SE24 and SE26 is oriented orthogonal to a main support surface AF24 or AF26 with which the guide rails 24 and 26 rest against the guide support 14.

As is particularly clear from FIG. 2, both of the guide rails 24 and 26 are embodied in the form of so-called fixed supporting rails, i.e. viewed in a section orthogonal to the longitudinal axis L of the linear guide unit 10 and therefore to the longitudinal axes of the guide rails 24 and 26, the rail feet 24a and 26*a* are encompassed on three sides by a guide rail-accommodating section 28 or 30 of the guide support 14. Each guide rail 24 and 26 rests with three support surfaces, which extend essentially in the direction of the longitudinal axis L of the linear guide unit 10, against corresponding counterpart support surfaces of the guide support 14. In FIG. 2, the support surfaces for the guide rail 24, for example, are labeled AF24L, AF24R, and AF24.

Figure 3:
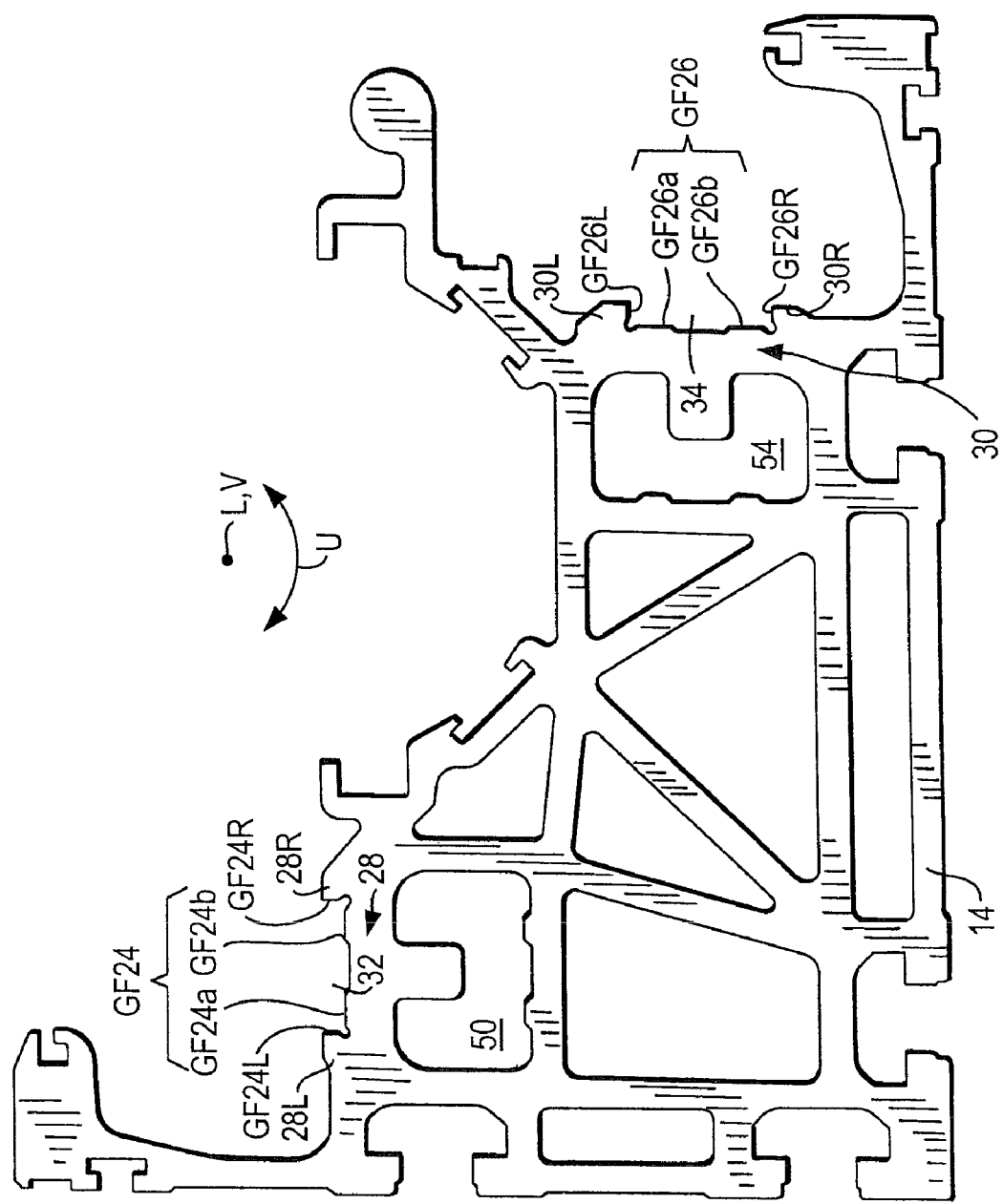
FIG. 3 shows a profile view of the guide support of the guide housing of the linear guide unit in FIGS. 1 and 2, viewed in the longitudinal direction of the guide support.

In FIG. 3, the counterpart support surfaces are labeled GF24L, GF24R, and GF24. The main counterpart support surface GF24 here is comprised of several parts, or more precisely stated, it is subdivided into two surface regions GF24*a* and GF24*b*. In addition, the counterpart support surfaces GF24L, GF24R, and GF24 extend essentially in the direction of the longitudinal axis L of the linear guide unit 10.

Correspondingly, the guide rail-accommodating section 30 is provided with counterpart support surfaces GF26L, GF26R, and GF26 extending parallel to the longitudinal axis L of the linear guide unit 10. Here, too, the main counterpart support surface GF26 is subdivided into two parallel counterpart surface sections GF26*a* and GF26*b*. Analogous to the support of the guide rail 24, the support surface AF26L of the guide rail 26 rests against the counterpart support surface GF26L of the guide support 14, the support surface AF26R rests against the counterpart support surface GF26R, and the main support surface AF26 rests against the main counterpart support surface GF26. The counterpart support surfaces GF24, GF24L, and GF24R of the guide rail-accommodating region 28, which is associated with the guide rail 24 and is provided in the guide support 14, define a groove 32 extending in the longitudinal direction L of the linear guide unit 10 and the guide support 14, into which the rail foot 24 of the guide rail 24 need only be inserted in order to be mounted onto the guide support 14.

Caulking at least one of the regions 28L or 28R of the guide rail-accommodating section 28, which region has the counterpart support surfaces GF24L and GF24R, in the direction toward the corresponding support surfaces AF24L and AF24R of the guide rail 24 fixes the guide rail 24 in relation to the guide support 14 orthogonal to the guide direction essentially without moving play. As a result, through form-locked engagement with the guide support 14, the guide rail 24 is secured against moving orthogonal to the longitudinal central symmetry plane SE24 depicted in FIG. 2. The same is true for the guide rail 26 accommodated in the guide rail-accommodating region 30 of the guide support 14. In this case, the counterpart support surfaces GF26L, GF26R, and GF26 form a groove 34, which extends the direction of the longitudinal axis L of the linear guide unit 10 and of the guide support 14 and into which the guide rail 26 is inserted. Caulking at least one of the lateral edge regions 30L and 30R of the guide rail-accommodating region 30 of the guide support 14 fixes the guide rail 26 in relation to the guide support 14 essentially without moving play.

It should be noted that the longitudinal central symmetry planes SE24 and SE26 pass through the guide rail-accommodating regions 28 and 30 associated with their respective guide rails.

In addition to the form-locked engagement described above, the caulking can also produce a sufficient frictional force, which prevents the guide rail from lifting up out of or sliding axially along the groove 32 or 34 with which it is associated. In addition, the guide rails 24 and 26 can be secured to the guide support 14 by means of screws. Preferably, the screws are screwed into the guide rails in such a way that the longitudinal axes of the screws essentially lie in the respective longitudinal central symmetry planes SE24 and SE26 of the respective guide rails 24 and 26.

The counterpart support surfaces GF24L and GF24 as well as GF24 and GF24R respectively enclose an essentially right angle in relation to each other. In order to be able to not only secure the rail in a form-locked manner against laterally shifting orthogonal to the longitudinal central symmetry planes SE24 and SE26, but also to secure the rail in a form-locked manner against lifting up from the guide support 14, it is conceivable for the counterpart support surfaces GF24L and GF24 as well as GF24 and GF24R to respectively enclose an angle of less than 90° with each other after the caulking. Then a contour is produced that resembles a dovetail.

It should also be expressly stated that, as is clear from FIG. 3, the counterpart support surfaces of the guide support 14 or also the support surfaces of the guide rail do not have to adjoin each other directly. Between two counterpart support surfaces of the guide support 14 or support surfaces of the guide rail 24 and 26 adjacent to one another in the circumference direction U (see double arrow in FIG. 2 and FIG. 3), material recesses can be provided, for example to facilitate the caulking of the lateral edge regions 28L, 28R and 30L, 30R of the guide rail-accommodating regions 28 and 30 of the guide support 14.

In the examples shown in FIGS. 1 through 4, the guide rail-accommodating regions 28 and 30 and the grooves 32 and 34 provided in them are produced during the extrusion of the guide support 14 or 114.

Revolving rows of roller elements support a sliding carriage 36 or 38 in an intrinsically known fashion on each of the guide rails 24 and 26 so that the sliding carriages can move in the guide direction F. Each sliding carriage 36, 38 is attached to the table part 18 by means of a connecting component 40 or 42. Through the rigid coupling to the table part 18, the sliding carriages 36, 38 constitute a sliding carriage assembly that can move as a unit.

The connecting components 40 and 42 protrude through guide openings 44 (associated with the guide rail 24) and 46 (associated with the guide rail 26) extending in the direction of the longitudinal axis L of the linear guide unit 10 and of the guide body 14. The guide opening 44 is covered by the upper run 48*a* of a revolving covering belt 48 so that little or no dirt can pass through the guide opening 44 to the guide rail 26. The lower run 48*b* of the covering belt 48 is guided in a first belt cavity 50 of the guide support 14.

The guide opening 46 is covered in the same way by an upper run 52*a* of a second covering belt 52 and the guide rail 26 is thus protected from external influences such as soiling. Analogous to the first covering belt, the lower run 52*b* of the covering belt 52 is guided in a second belt cavity 54. The second covering belt 52 also revolves.

The belt cavities 50 and 54 are also produced during the extrusion of the guide support 14.

At its longitudinal ends, are not shown in FIGS. 1 through 4, the covering element 16 is supported on the guide support 14 by end-mounted sealing units of the type known from DE 102 02 737 A1. In addition, in the example shown in FIG. 1 and FIG. 2, the covering element 16 is supported at least in parts of its longitudinal direction by a plurality of supporting elements 56 on a drive spindle 58 for driving the sliding carriages 36 and 38. Supporting elements of this kind are known, for example, from the above-mentioned DE 102 02 737 A1 or also from EP 1 120 585 A2. With regard to the description of the end-mounted sealing units and the supporting elements, the entire content of the disclosures in the above-mentioned published patent applications are included herein by reference.

The covering element 16 has two leg sections 16a and 16b essentially orthogonal to each other. The two leg sections 16a and 16b are connected to each other by means of a connecting section 60. The leg sections 16a, 16b and the connecting section 60 extend essentially in the direction of the longitudinal axis L of the linear drive unit 10.

In order to avoid error sources, the outer surfaces 16a1 and 16b1 of the leg sections 16a and 16b and the outer surface 60a of the connecting section 60 are essentially smooth and flat. In relation to an axis parallel to the longitudinal axis L, the connecting section encloses a connecting inclination angle α with the leg section 16a and encloses a connecting inclination angle β with the leg section 16b; in the example shown, the angles α and β are less than 180°.

The provision of the connecting section 60, which connects the leg sections 16a and 16b of the covering element 16 reduces the structural volume of the guide housing 12. The reduction of the structural volume of the guide housing 12 by means of the connecting section 60 also permits the table part 18 to be provided with a reinforcing formation 62, which connects the table surfaces 18a and 18b or more precisely stated, the table part legs 18' and 18" to which these table surfaces belong. This stabilizes the position of the table surfaces 18a and 18b in relation to each other and increases the rigidity of the table part. For weight reduction purposes, the reinforcing formation 62 is embodied in the form of a strut that encloses a cavity 64 with the table part 18.

In the circumference direction U, the outer surface 62a follows the contour curve of the outer surface 60a of the connecting section 60. The outer surfaces 60a of the connecting section 60a and of the reinforcing formation 62 face each other so that the connecting section 60 and the reinforcing formation 62 form a gap S on the order of a few millimeters in size. In order to prevent foreign objects from falling into wider gap regions, which objects could then get into narrower gap regions and thus impede or even prevent the movement of the table part 18 in relation to the guide housing 12, the gap S has an essentially constant gap width the direction of the longitudinal axis L of the linear guide unit 10 as well as orthogonal to it.

In the example shown in FIGS. 1 and 2, the sliding carriage assembly comprised of the sliding carriages 36 and 38 is driven by a spindle. However, specialists in the field will also understand that any other drive mechanism can be used in lieu of the spindle drive, including toothed belts, linear motors, or piston/cylinder assemblies.

In the example shown in FIGS. 1 and 2, when installed, the guide support 14 and the covering element 16 form guide cavities 66 and 68, each of which accommodates an assembly comprised of a sliding carriage and guide rail. The guide cavity 66 accommodates the sliding carriage 36 and the guide rail 24 while the guide cavity 68 accommodates the sliding carriage 38 and the guide rail 26.

Figure 4:
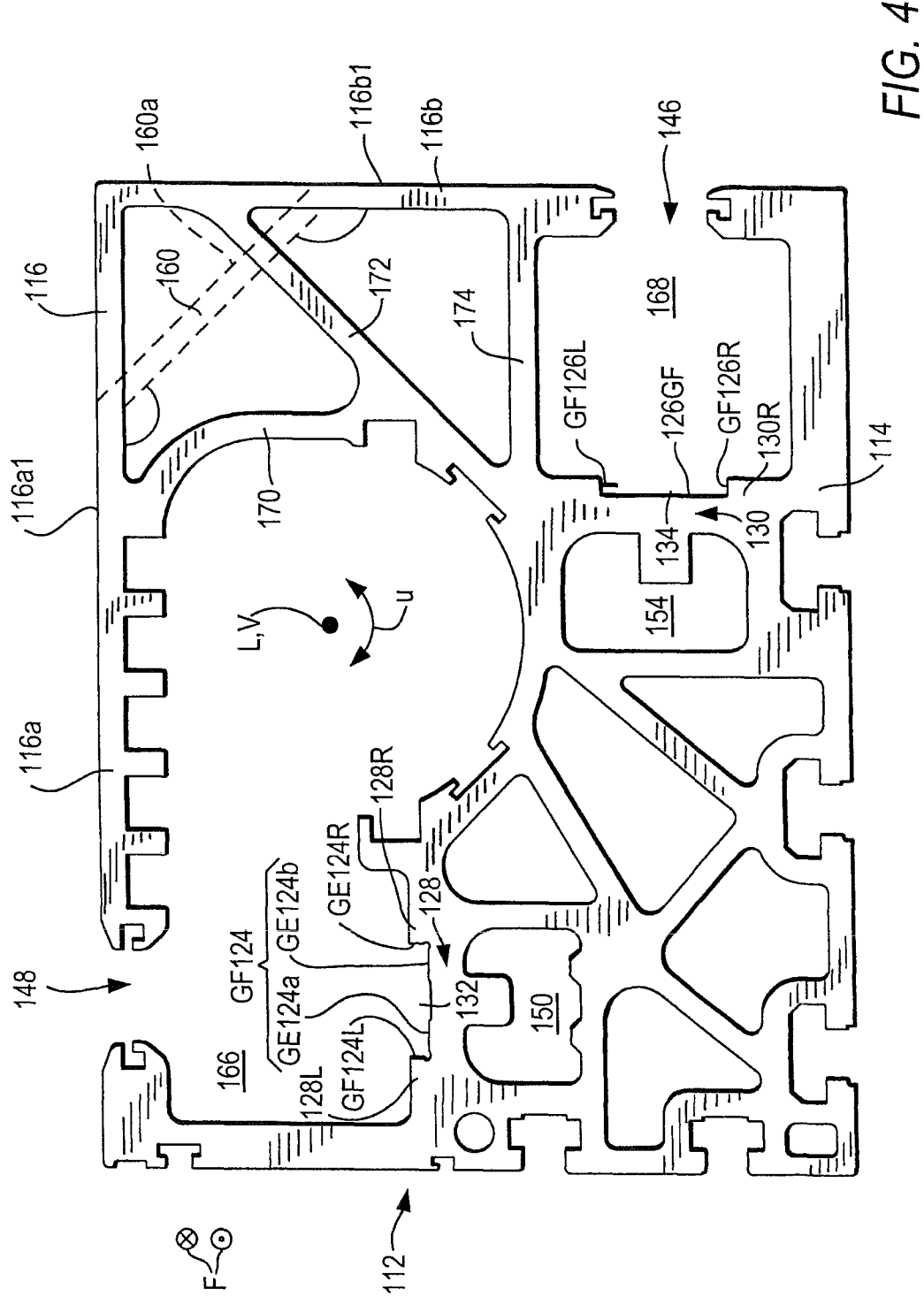
FIG. 4 shows an alternative embodiment of a guide housing for use in a linear guide unit according to the present invention.
Figure 5B:
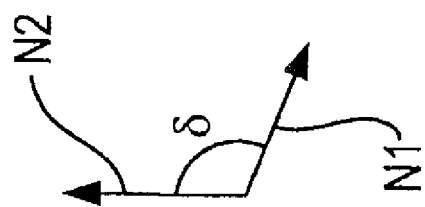
FIG. 5 shows a geometric view of a pair of counterpart support surfaces to facilitate comprehension of the present application.
Figure 5A:
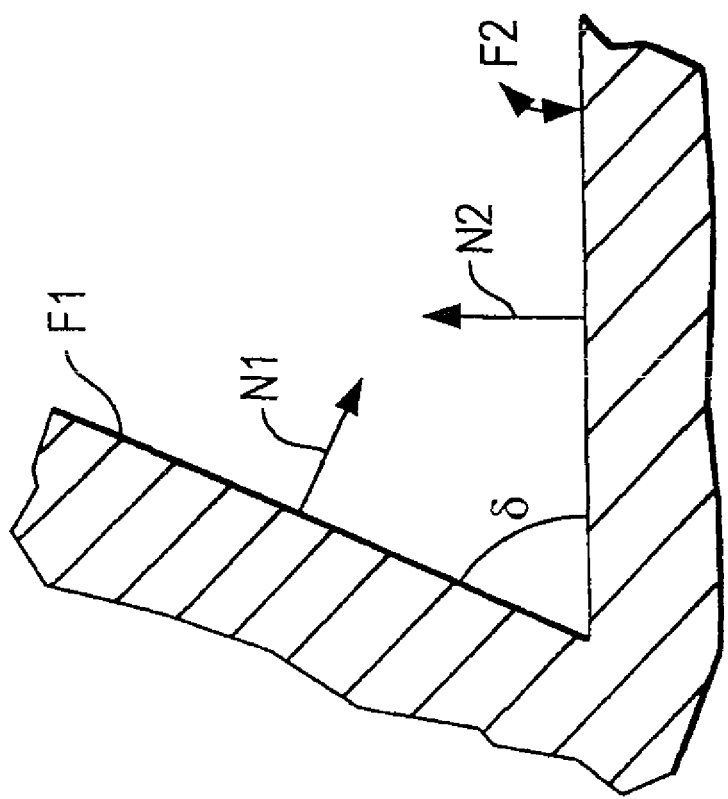

FIG. 4 shows an alternative guide housing 112. Features of the guide housing 112 that correspond in function to those of the guide housing 12 in FIGS. 1 through 3 are provided with the same reference numerals in FIG. 4, except for the fact that each number is increased by 100. Express reference is hereby made to the description of these features in connection with FIGS. 1 through 3. FIG. 4 will be explained only insofar as the embodiment form depicted therein differs from the one in FIGS. 1 through 3.

The essential difference between the embodiment form of the guide housing 112 shown in FIG. 4 and the one shown in FIGS. 1 through 3 lies in that the cover 116 is embodied as integral to the guide support 114. This is achieved through the use of an appropriate die for the extrusion of the guide housing 112. The ribs 170, 172, and 174 connect the leg sections 116a and 116b of the cover 116 to the guide support 114 in an integral fashion. The guide housing 112 has a guide support section 114 and a covering section 116.

In FIG. 4, solid lines depict a covering section 116 in which the leg sections 116a and 116b adjoin each other directly, i.e. no connecting section is provided between them. But as is depicted with dashed lines, it is also possible for a connecting section 160 to be provided between the leg sections 116a and 116b of the covering section 116, which connecting section 160 adjoins the first leg section 116a at a connecting inclination angle of 90° <α<180° and adjoins the second leg section 116b at a connecting inclination angle of 90° <β<180°.

It should also be noted that in the embodiment form in FIG. 4, the counterpart support surfaces GF126L, GF126R, and GF126 are comprised of flat surfaces that adjoin one another; the counterpart support surfaces extend essentially in the direction of the longitudinal axis L of the guide housing 112 and the counterpart support surfaces GF126L and GF126 as well as GF126R and GF126 enclose a respective angle of 90°. The counterpart support surfaces GF126L, GF126R, and GF126 thus define a groove 134 extending in the direction of the longitudinal axis L to accommodate a rail foot of a guide rail. In addition, the main counterpart support surface GF126 is not comprised of multiple parts, as before.

Figure 6:
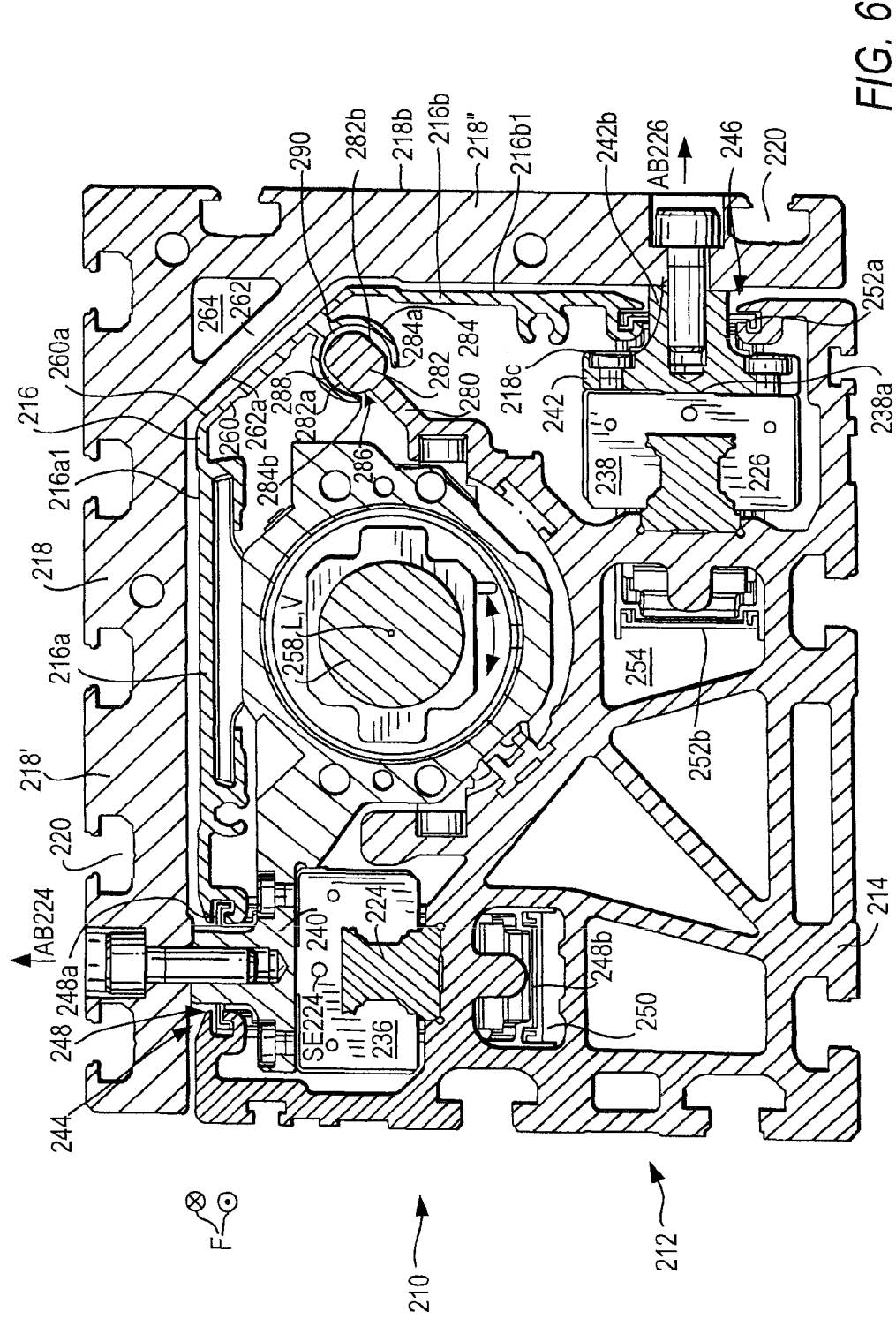
FIG. 6 shows a view that corresponds to FIG. 2 of another embodiment form of a linear guide unit, viewed from an end in the longitudinal direction of the linear guide unit.

FIG. 6 shows another embodiment form of a linear guide unit according to present invention. Elements that are the same as those in FIG. 2 are provided with the same reference numerals, increased by 200. Components that are the same as those in FIG. 4 are provided with the same reference numerals, increased by 100.

Apart from this, the embodiment form in FIG. 6 will be explained only with regard to how it differs from the one in FIG. 2. For explanation of components already known from the description of FIGS. 2 and 4, reference is hereby expressly made to the previous description of these drawings.

The guide support 214 has a bridge piece 280 that extends toward the connecting segment 260 of the covering element 216. The bridge piece 280 extends in the longitudinal direction L of the guide support and therefore also in the guide direction F over essentially the entire length of the guide support 214. At its free longitudinal end, the bridge piece 280 has a material thickening 282. An embracing clamp 284 integral to the connecting section 260 of the covering element 216 engages this material thickening 282 from behind when the guide housing 212 is fully assembled. In the example shown in FIG. 6, the embracing clamp 284 also extends over essentially the entire length of the covering element 216 in the guide direction F.

The embracing clamp 284 is embodied in the form of a partial, hollow cylinder; in the assembled state of the guide housing 212, the bridge piece 280 extends through the circumference surface opening 286 of the embracing clamp 284.

The side surfaces 282a and 282b of the material thickening 282 are flattened in order to make it easier for the embracing clamp 284 to be snapped onto the material thickening 282. In the assembled state of the guide housing 212, the longitudinal ends of the clamp legs 284a and 284b adjacent to the circumference surface opening 286 of the embracing clamp 284 engage behind flat sections of the material thickening 282, which have a plane normal that has a normal component oriented away from the outside surface 262a of the reinforcing formation 262. In order to reduce the vibration propensity of the covering element 216, a vibration-damping material 290 is provided in the gap space 288 between the material thickening 282 and the embracing clamp 284. This vibration-damping material 290 can, for example, be an elastic polymer.

To this end, the gap space 288 can be filled in some places or can be filled as completely as possible with the vibration-damping material 290. Furthermore, the vibration-damping material 290 can be applied to the material thickening 282 and/or to the embracing clamp 284 before assembly of the guide support 214 and covering element 216 or the vibration-damping material can be introduced into the gap space 288 after an assembly step, for example in the form of a liquid or pasty substance that then hardens in the gap space 288.

Figure 7:
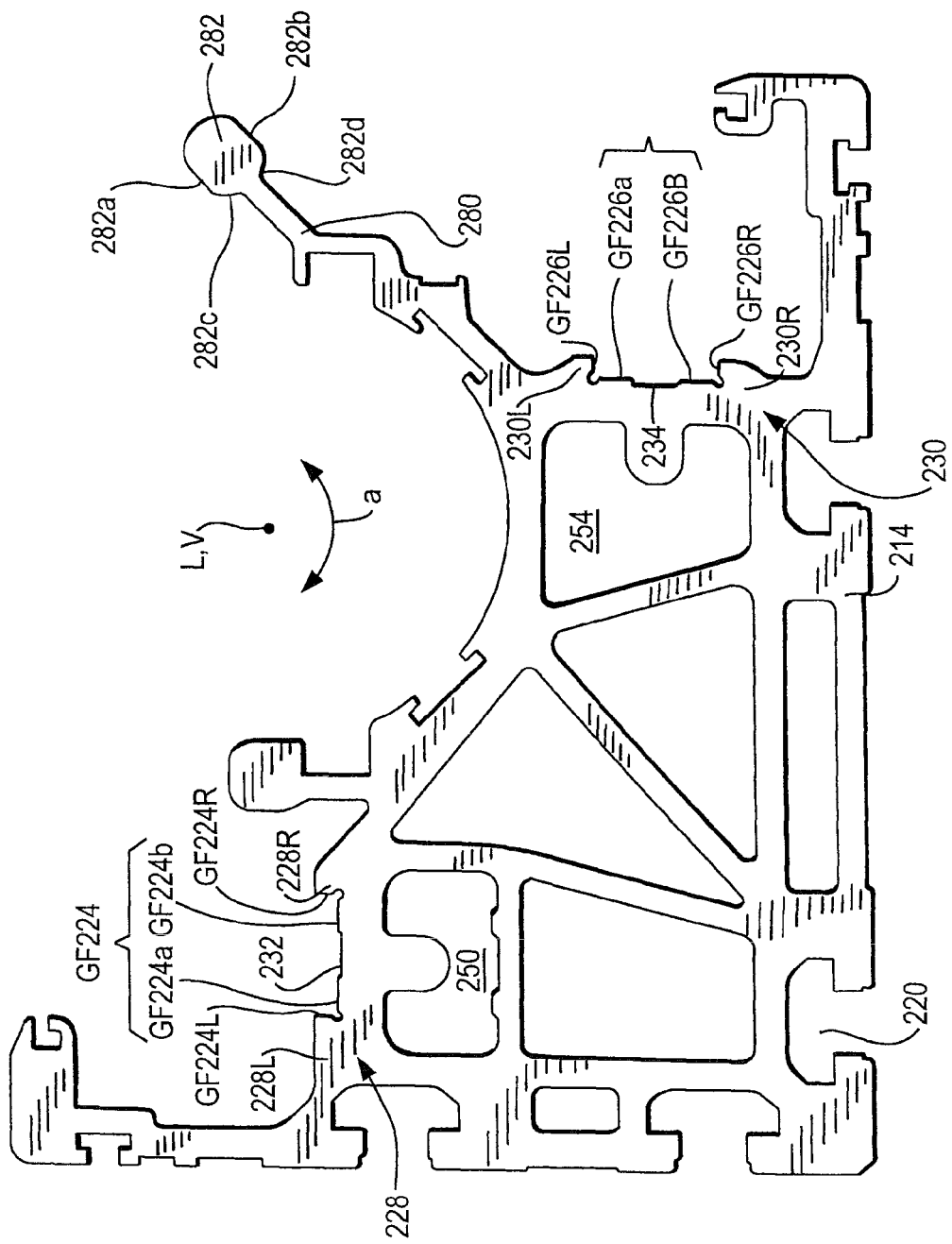
FIG. 7 shows a profile view of the guide support of the linear guide unit in FIG. 6, viewed in the longitudinal direction of the guide support.

FIG. 7 shows a profile view of the guide support 214 from FIG. 6. Once again, the bridge piece 280 appears in the drawing, as does the material thickening 282, which is provided at the longitudinal end of the bridge piece 280 and has the flattened side surfaces 282a and 282b.

The additional space available in FIG. 7 makes it possible to provide reference numerals for the contact surfaces 282c and 282d not specifically labeled in FIG. 6, against which the longitudinal ends of the legs 284a and 284b of the embracing clamp 284 of the cover element 216 rest when the guide housing 212 is fully assembled.

Also in FIG. 7, reference numerals are provided for the counterpart surfaces on the guide rail embracing sections 228, 230 that do in fact appear in FIG. 6, but are not provided with reference numerals therein for the sake of clarity.

Figure 8:
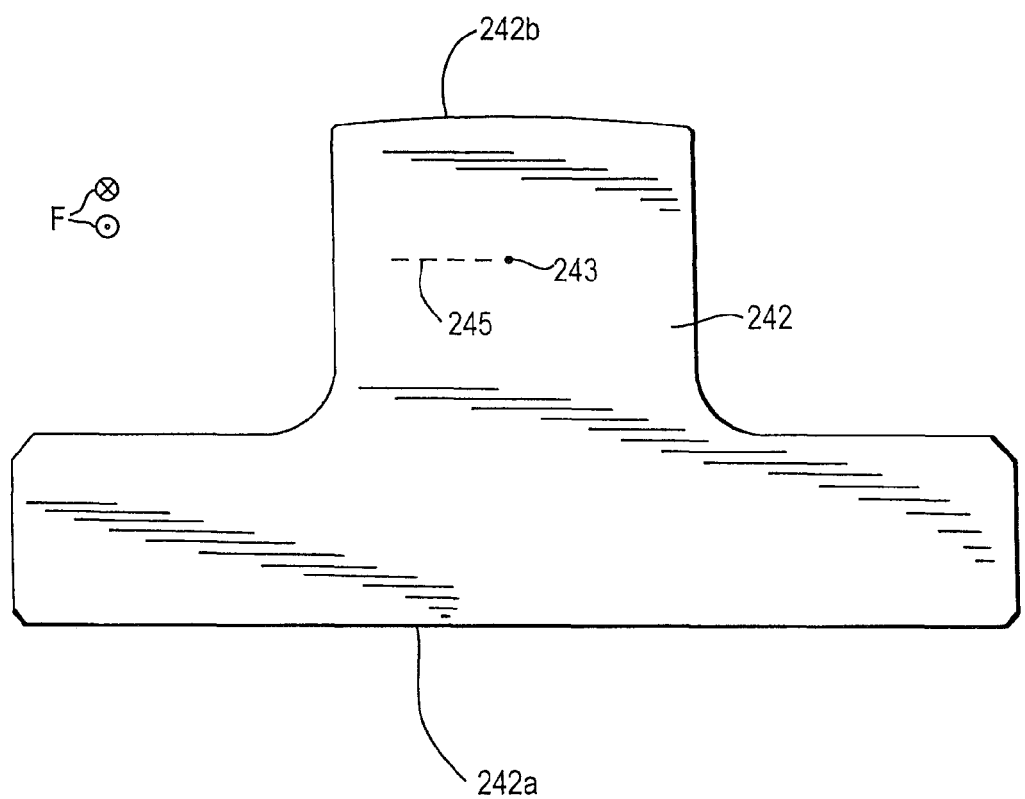
FIG. 8 shows an enlarged depiction of the connecting component used in the embodiment form in FIGS. 6 and 7, for connecting a sliding carriage to a table part.

FIG. 8 shows an enlargement of the connecting component 242 provided on the sliding carriage 238.

The connecting component 242 has a first contact surface 242a with which it rests against a sliding carriage counterpart surface 238a of the sliding carriage 238 (also see FIG. 6) in the assembled state. Both the first contact surface 242a and the sliding carriage counterpart surface 238a are embodied as essentially flat.

On its longitudinal end oriented away from the sliding carriage, the connecting component 242 has a second contact surface 242b with which it rests against a table part counterpart surface 218c of the table part 218, in particular the table leg 18" (also see FIG. 6). Whereas the table part counterpart surface 218c is embodied as essentially flat, the second contact surface 242b of the connecting component 242 is embodied as crowned. This means that the second contact surface 242b has a convex curvature around at least one curvature axis 243. Preferably, the curvature axis 243 of the second contact surface 242b extends so that in the assembled state of the connecting component 242, this curvature axis extends in the guide direction F. In addition, the second contact surface 242b can also be convexly curved around a second curvature axis 245 orthogonal to the curvature axis 243. The second curvature axis 245 is depicted with a dashed line in FIG. 8. This second curvature axis 245 is preferably situated so that it extends orthogonal to the curvature axis 243 and, in the assembled state, also extends orthogonal to the lifting direction AB226.

The convex curvature of the second contact surface 242b reduces and/or prevents distortions of the table-part 218, which can arise due to manufacturing and/or assembly tolerances.

It will be understood that each of the elements described above, or two or more together, may also find a useful application in other types of constructions differing from the types described above.

While the invention has been illustrated and described as embodied in a linear guide unit, in particular gantry axis, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What claimed is:

1. A linear guide unit, that has an oblong guide support (14; 114; 214), which is provided with two substantially parallel guide rails (24, 26; 224, 226) extending in the guide direction (F), but angled in relation to each other around an axis (V) parallel to the guide direction (F), each of which has at least one sliding carriage (36, 38; 236, 238) guided on it so that it can slide in the guide direction (F), the sliding carriages (36, 38; 236, 238) being connected to a sliding carriage assembly (36, 38; 236, 238) capable of moving as a unit in the guide direction (F), wherein the two guide rails (24, 26; 224, 226) rest substantially without moving play against at least two-part counterpart support surfaces (GF24, GF24L, GF24R, GF26, GF26L, GF26R; GF124, GF124L, GF124R, GF126, GF126L, GF126R; GF224, GF224L, GF224R, GF226, GF226L, GF226R) of the guide support (14; 114; 214) extending essentially in the guide direction (F), two of the counterpart support surfaces (GF24, GF24L, GF24R, GF26, GF26L, GF26R; GF124, GF124L, GF124R, GF126, GF126L, GF126R; GF224, GF224L, GF224R, GF226, GF226L, GF226R) enclosing a predetermined angle between them, wherein a table part (18; 218) is provided, which has at least two table surfaces (18a, 18b; 218a, 218b) that are angled in relation to each other around an angle axis essentially parallel to the guide direction (F) and to which each of the sliding carriages (36, 38; 236, 238) is attached so that they can move as a unit, the table part (18; 218) being provided with a reinforcing formation (62; 262), wherein the table part (18) is provided with the reinforcing formation (62; 262) in such a way that an outer surface (62a, 262a) of the reinforcing formation and an outer surface (60a; 160a; 260a) of a connecting section face each other, at least in parts, and wherein the outer surface (62a; 262a) of the reinforcing formation and the outer surface (60a; 160a; 260a) of the connecting section form a gap (S) that extends in the circumference direction (U), at least in parts.

2. A linear guide as defined in claim 1, wherein the gap (S) has a virtually constant gap width in the circumferential direction (U).

3. A linear guide unit as defined in claim 1, wherein the reinforcing formation (62; 262) is a rib (62; 262), which connects partial table sections (18', 18"; 218', 218") to which different table surfaces (18a, 18b; 218a, 218b) of the table part (18; 218) belong.

* * * * *